US009182049B2

(12) United States Patent
Lee et al.

(10) Patent No.: US 9,182,049 B2
(45) Date of Patent: Nov. 10, 2015

(54) LATCHING CLUTCH VALVE

(71) Applicant: Schaeffler Technologies AG & Co. KG, Herzogenaurach (DE)

(72) Inventors: Brian Lee, York, SC (US); Vural Ari, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 349 days.

(21) Appl. No.: 13/775,383

(22) Filed: Feb. 25, 2013

(65) Prior Publication Data
US 2013/0233396 A1 Sep. 12, 2013

Related U.S. Application Data

(60) Provisional application No. 61/608,258, filed on Mar. 8, 2012.

(51) Int. Cl.
| *F16K 15/18* | (2006.01) |
| *F16K 31/22* | (2006.01) |
| *F16K 31/122* | (2006.01) |
| *F16K 17/06* | (2006.01) |
| *F16H 61/02* | (2006.01) |

(52) U.S. Cl.
CPC .......... *F16K 31/122* (2013.01); *F16H 61/0276* (2013.01); *F16K 17/065* (2013.01); *F16K 31/1226* (2013.01); *F16H 2061/0279* (2013.01); *Y10T 137/0379* (2015.04); *Y10T 137/6851* (2015.04)

(58) Field of Classification Search
CPC ............ F16D 25/14; F16D 2048/0221; F16H 61/0276; F16H 2061/0279; F16K 17/065; F16K 31/122; F16K 31/1221; F16K 31/1226
USPC ......... 137/512.1, 538; 192/85.63; 251/73, 75; 267/159, 171; 475/72, 78, 83; 477/52
See application file for complete search history.

(56) References Cited

U.S. PATENT DOCUMENTS 1,895,591 A * 1/1933 Spencer ........................... 60/529
1,988,345 A * 1/1935 Vaughn ......................... 428/616
(Continued)

FOREIGN PATENT DOCUMENTS

EP 0109746 A1 5/1984
JP 2008-157385 A 7/2008
(Continued)

OTHER PUBLICATIONS

International Search Report for PCT/US2013/027577, mailed on Jul. 8, 2013 by Korean Intellectual Property Office.

*Primary Examiner* — Marina Tietjen
*Assistant Examiner* — Seth W Mackay-Smith
(74) *Attorney, Agent, or Firm* — Kevin L. Parks

(57) ABSTRACT

A hydraulic valve for a vehicle transmission includes a housing, a valve piston, an actuating piston, and a bi-stable spring. The housing is connectable with an inlet passage and an outlet passage for the transmission. The valve piston is sealed to the housing and selectively blocks a fluid flow between the inlet passage and the outlet passage. The actuating piston is sealed to the housing and is arranged to be displaceable by a hydraulic pressure in the inlet passage. The bi-stable spring is engaged with the valve piston and the actuating piston. In some example embodiments, the bi-stable spring is axially fixed with regards to the valve piston and displaceable by the actuating piston.

17 Claims, 6 Drawing Sheets

(56) References Cited

U.S. PATENT DOCUMENTS

| | | | | |
|---|---|---|---|---|
| 2,521,891 A | * | 9/1950 | Beams | 251/75 |
| 2,561,405 A | * | 7/1951 | O'Brien et al. | 267/159 |
| 2,688,336 A | * | 9/1954 | Huntington | 137/494 |
| 2,690,875 A | * | 10/1954 | Jenkins | 236/48 R |
| 2,783,020 A | * | 2/1957 | Kleczek | 251/63.5 |
| 3,099,282 A | * | 7/1963 | Miller et al. | 137/87.01 |
| 3,731,707 A | * | 5/1973 | Berle et al. | 137/625.66 |
| 4,091,832 A | | 5/1978 | Snyder et al. | |
| 4,240,458 A | * | 12/1980 | Huff | 137/315.05 |
| 4,827,832 A | * | 5/1989 | Hartley et al. | 91/269 |
| 4,872,638 A | * | 10/1989 | Thompson et al. | 251/54 |
| 4,890,636 A | * | 1/1990 | Higuchi | 137/115.14 |
| 6,162,147 A | | 12/2000 | Moorman | |
| 7,059,579 B2 | * | 6/2006 | Stevenson | 251/63 |
| 7,213,689 B2 | | 5/2007 | Chang | |
| 2011/0315503 A1 | | 12/2011 | Ari et al. | |

FOREIGN PATENT DOCUMENTS

| | | |
|---|---|---|
| KR | 20-0391536 Y1 | 8/2005 |
| WO | 2011-160792 A2 | 12/2011 |

* cited by examiner

LATCHING CLUTCH VALVE

FIELD

The invention relates generally to a transmission clutch valve, and more specifically to a pressure actuated latching clutch valve.

BACKGROUND

Latching valves are known. One example is shown in commonly-assigned United States Patent Publication No. 2011/0315503.

BRIEF SUMMARY

Example aspects broadly comprise a hydraulic valve for a vehicle transmission including a housing, a valve piston, an actuating piston, and a bi-stable spring. The housing is connectable with an inlet passage and an outlet passage for the transmission. The valve piston is sealed to the housing and selectively blocks a fluid flow between the inlet passage and the outlet passage. The actuating piston is sealed to the housing and is arranged to be displaceable by a hydraulic pressure in the inlet passage. The bi-stable spring is engaged with the valve piston and the actuating piston. In some example embodiments, the bi-stable spring is axially fixed with regards to the valve piston and displaceable by the actuating piston. In an example embodiment, an inner diameter of the bi-stable spring is fixed to the valve piston and is displaceable in a first direction by the valve piston, and an outer diameter of the bi-stable spring is displaceable in the first direction by the actuating piston. In an example embodiment, the bi-stable spring is fixed to the valve piston by a retainer installed in a central bore of the valve piston.

In an example embodiment, the housing includes a valve seat and the valve includes a return spring operating between the valve seat and the actuating piston. In some example embodiment, the housing includes a valve seat with a conical surface, the valve piston includes a conical surface, and the valve is configured to block the flow between the inlet passage and the outlet passage when the valve seat conical surface and the valve piston conical surface are in contact. In an example embodiment, the valve includes a holding spring urging the valve piston into contact with the valve seat. In an example embodiment, the valve seat includes an inwardly-facing circumferential surface and the valve piston includes an outwardly-facing circumferential surface sealed to the valve seat circumferential surface.

In some example embodiments the valve includes a chamber. The chamber is partly formed by the housing and the actuating piston. The actuating piston includes an orifice extending through the actuating piston to the chamber. In an example embodiment, the valve includes first and second seals for sealing the actuating piston to the housing.

Other example aspects broadly comprise a vehicle transmission including the hydraulic valve, a transmission housing including a bore, and a cap threadingly engaged with the bore. The hydraulic valve is installed in the bore, the valve housing is sealed to the bore, and the cap retains the valve in the bore. In an example embodiment, the inlet passage extends through the cap into the bore. In an example embodiment, the outlet passage extends from the bore through the housing.

Other example aspects broadly comprise a method of operating a hydraulic valve for a transmission including the steps of applying an operating pressure to an actuating piston, allowing flow through the valve, applying an actuating pressure that is higher than the operating pressure to the actuating piston to snap a bi-stable spring to a flow blocking position, reducing the pressure to block flow between an inlet and outlet of the valve, and applying the operating pressure to a valve piston to snap the bi-stable spring to a flow through position.

In an example embodiment, the operating pressure is less than 19 bar and the actuating pressure is greater than 21 bar. In an example embodiment, an axial displacement of the actuating piston is resisted by a return spring and a force of the actuating pressure acting on the actuating piston is greater than a force of the return spring acting on the actuating piston. In some example embodiments, an axial displacement of the valve piston is resisted by a holding spring and, in a flow through position, a force of the holding spring acting on the valve piston is less than a force of the bi-stable spring acting on the valve piston. In an example embodiment, the hydraulic valve is installed in a transmission housing with an inlet and outlet passage and the force of the holding spring controls a pressure in the outlet passage when the valve is in the flow blocking position. In an example embodiment, the outlet passage pressure is 0.5 to 1.5 bar.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
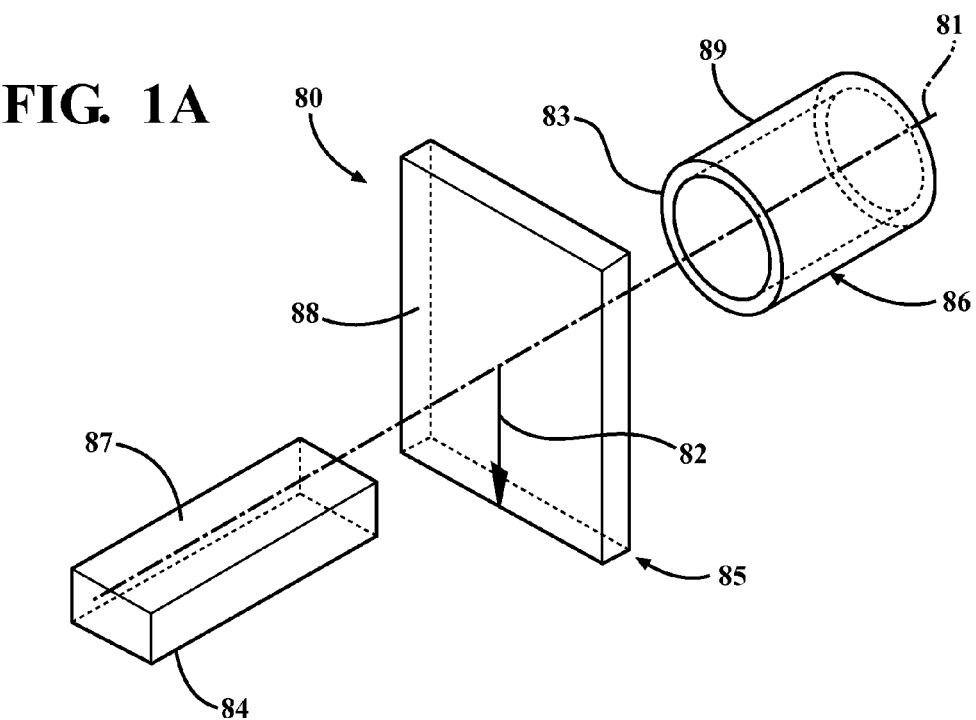
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
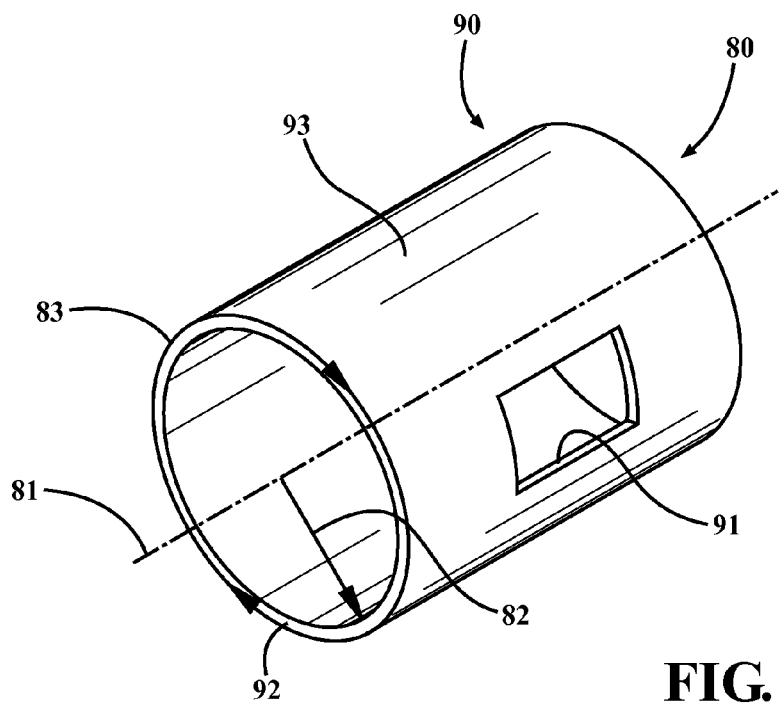
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
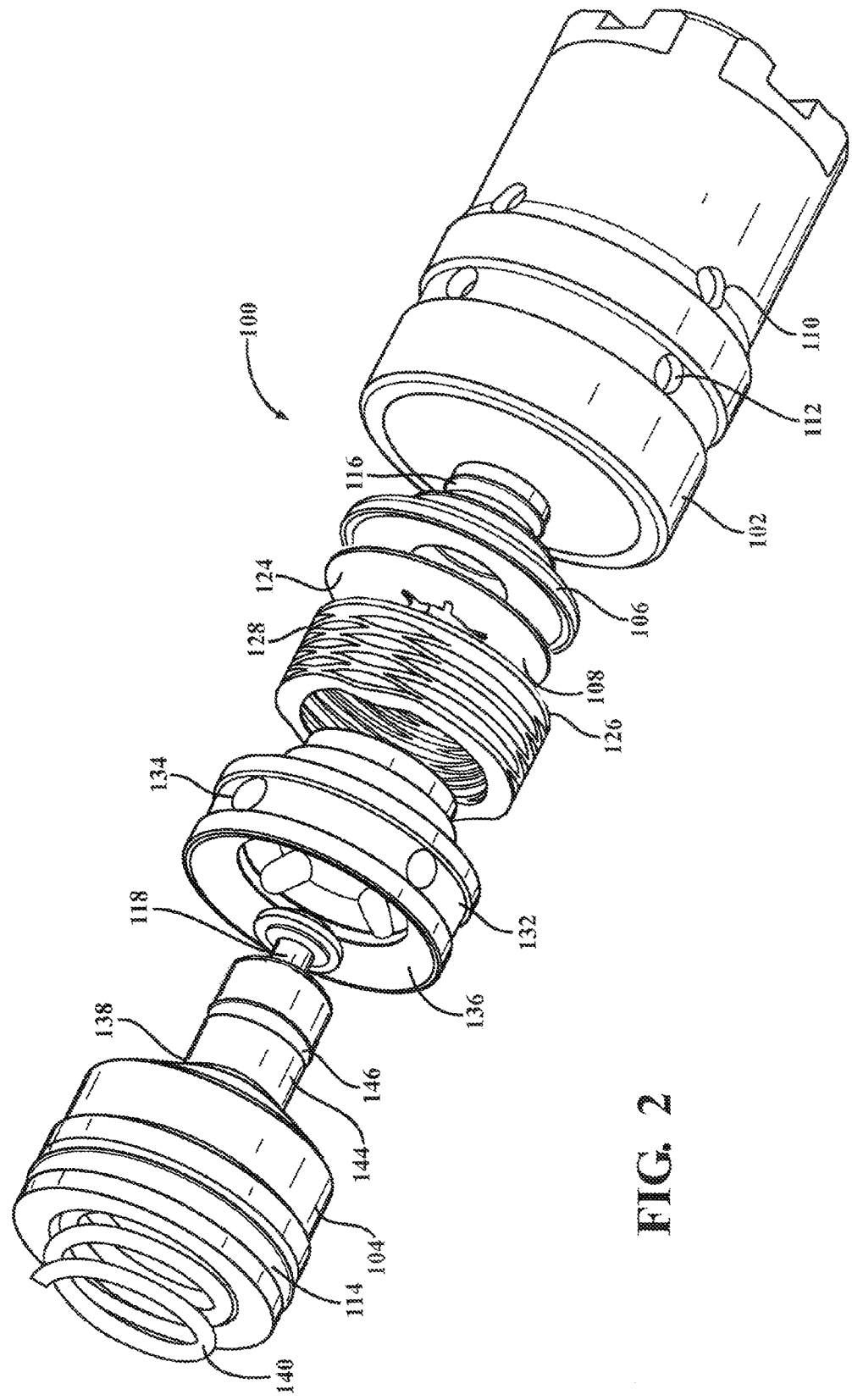
FIG. 2 is an exploded view of a first embodiment of a latching clutch valve according to an example aspect.

The following description is made with reference to FIG. 2. FIG. 2 is an exploded view of a latching clutch valve 100 according to an example aspect. Hydraulic valve 100 includes housing 102, valve piston 104, actuating piston 106 and bi-stable spring 108. Housing 102 is connectable with an inlet passage and an outlet passage for the transmission at ports 110 and 112, respectively, as described below. Valve piston 104 is sealed to housing 102 at seal 114. Valve piston 104 is arranged to selectively block fluid flow between ports 110 and 112. Otherwise stated, valve piston selectively blocks fluid flow between the inlet passage and the outlet passage. Actuating piston 106 is sealed to housing 102 at seal 116 and is arranged to be displaceable by a hydraulic pressure in the inlet passage as described below.

Figure 3:
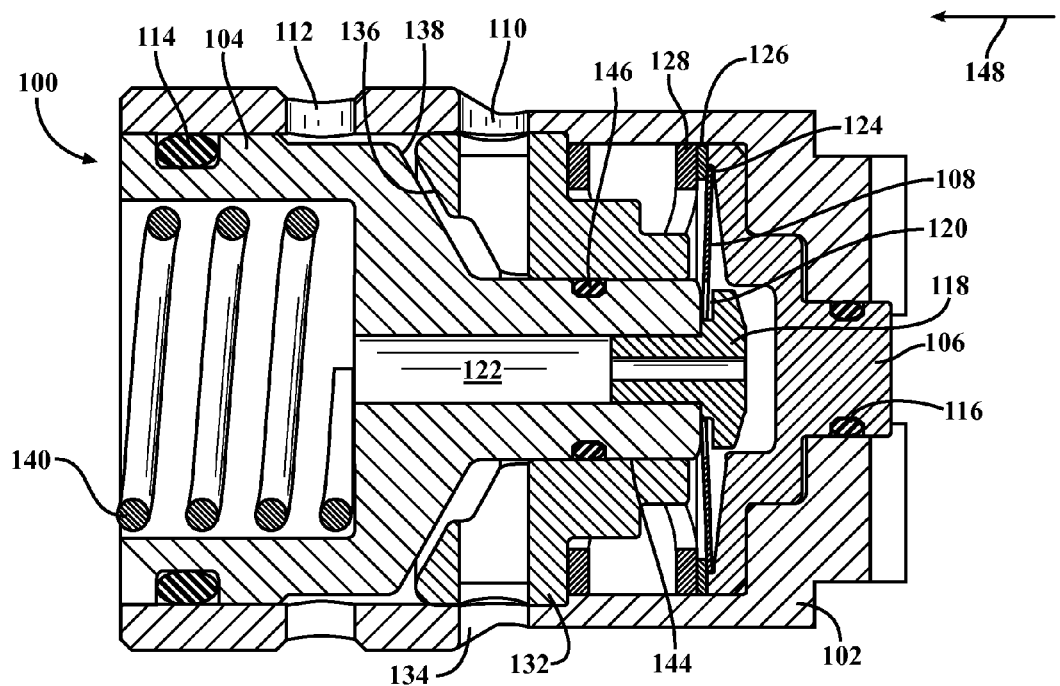
FIG. 3 is a cross-section view of the latching clutch valve of FIG. 2 shown in an open position.

Bi-stable spring 108 is engaged with valve piston 104 and actuating piston 106. That is, spring 108 is axially fixed with regards to valve piston 104 and displaceable by actuating piston 106. Retainer 118 is screwed into piston 104 to fix inner diameter 120 of spring 108 to the valve piston. That is, retainer 118 is installed in central bore 122 of valve piston 104 (ref. FIG. 3). Outer diameter 124 is retained between actuating piston 106 and ring 126 which is in turn urged towards piston 106 by spring 128. In an example embodiment, spring 128 is a plurality of springs stacked together. Inner diameter 120 of spring 108 is displaceable in direction 130 by retainer 118 to move the spring to a snap-back position as described below. Outer diameter 124 of spring 108 is displaceable in direction 130 by actuating piston 106 to move the spring to a snap-over position as described below.

Housing 102 includes valve seat 132 with port 134. Port 134 is in fluid communication with inlet port 110. Return spring 128 operates between the valve seat and the actuating piston. Valve seat 132 includes conical surface 136 and valve piston 104 includes conical surface 138. Valve 100 is configured to block flow between inlet port 110 and the transmission inlet passage, and port 112 and the transmission outlet passage when conical surfaces 136 and 138 are in contact. Holding spring 140 urges the valve piston into contact with the valve seat. Valve seat 132 comprises inwardly-facing circumferential surface 142 and valve piston 104 comprises outwardly-facing circumferential surface 144. Surfaces 142 and 144 are sealed to one-another by seal 146. Seals 114, 116, and 146 may be any seals known in the art. In an example embodiment, the seals are o-ring seals.

The following description is made with reference to FIG. 3. FIG. 3 is a cross-section view of the latching clutch valve of FIG. 2 shown in an open position. Operation of latching valve 100 will now be described. Port 110 is hydraulically connected to a chamber for actuating piston 106. That is, the valve is arranged in a transmission such that a pressure entering port 110 is the same as a pressure acting on piston 106. During normal operation of the transmission, operating pressure is introduced to valve 100 through port 110 and exits through port 112 to engage a transmission clutch (not shown). The operating pressure is applied to the actuating piston. The pressure is below a threshold value such that the pressure force acting on piston 106 is lower than the force from spring 128 so that any movement of piston 106 is minimal and insufficient to snap spring 108 as shown in FIG. 3. Valve piston 104 receives axial force from holding spring 140 and bi-stable spring 108, and, in the flow through position depicted in FIG. 3, the force of the holding spring is less than the force of the bi-stable spring. In an example embodiment, operating pressure is generally less than 19 bar.

Figure 4:
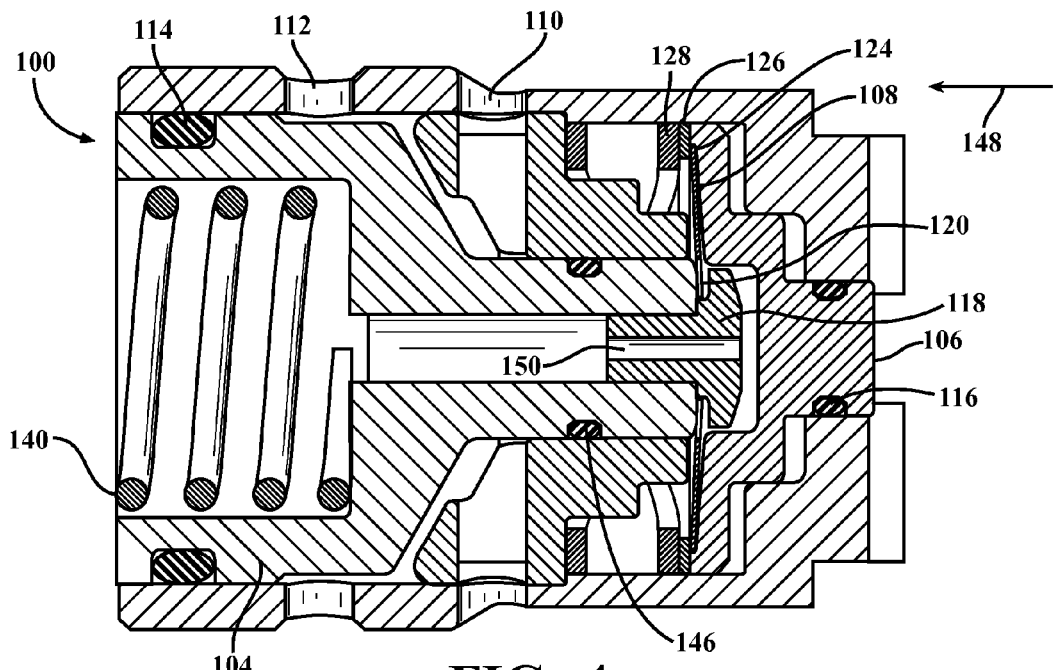
FIG. 4 is a cross-section view of the latching clutch valve of FIG. 2 shown in a snap-over position.

The following description is made with reference to FIG. 4. FIG. 4 is a cross-section view of the latching clutch valve of FIG. 2 shown in a snap-over position. When operating conditions require a latched valve, pressure in port 110 is increased beyond a threshold pressure, displacing piston 106 in direction 148. That is, an actuating pressure, higher than the operating pressure, is applied to actuating piston 106. It should be noted that, during the pressure increase, valve 100 remains open so that the increased pressure passes through the valve to output port 112 and to the clutch or other device acted on by the pressure. In an example embodiment, the threshold value is about 21 bar. Otherwise stated, the actuating pressure is greater than 21 bar.

Additional pressure, or actuating pressure, acting on piston 106 displaces outer diameter 124 of spring 108 by compressing spring 128, thereby snapping the spring into a latched, or flow blocking, position. That is, axial displacement of actuating piston 106 is resisted by return spring 128 and the force from the actuating pressure acting on piston 106 is greater than the force of spring 128 acting on piston 106. As discussed above, spring 108 is a bi-stable spring. That is, spring 108 may be at rest in two geometric configurations and can be moved between those configurations by an external force (such as force from piston 106). This phenomenon is similar to that in early metal oil cans. A comparison of FIGS. 3 and 4 shows spring 108 extending up and to the right in FIG. 3, and up and to the left in FIG. 4. As can be seen in FIG. 4, force from piston 106 also urges inner diameter 120 of spring 108 away from retainer 118. In an example embodiment, retainer 118 includes channel 150 for draining fluid leaking through seal 116 and/or 146.

Figure 5:
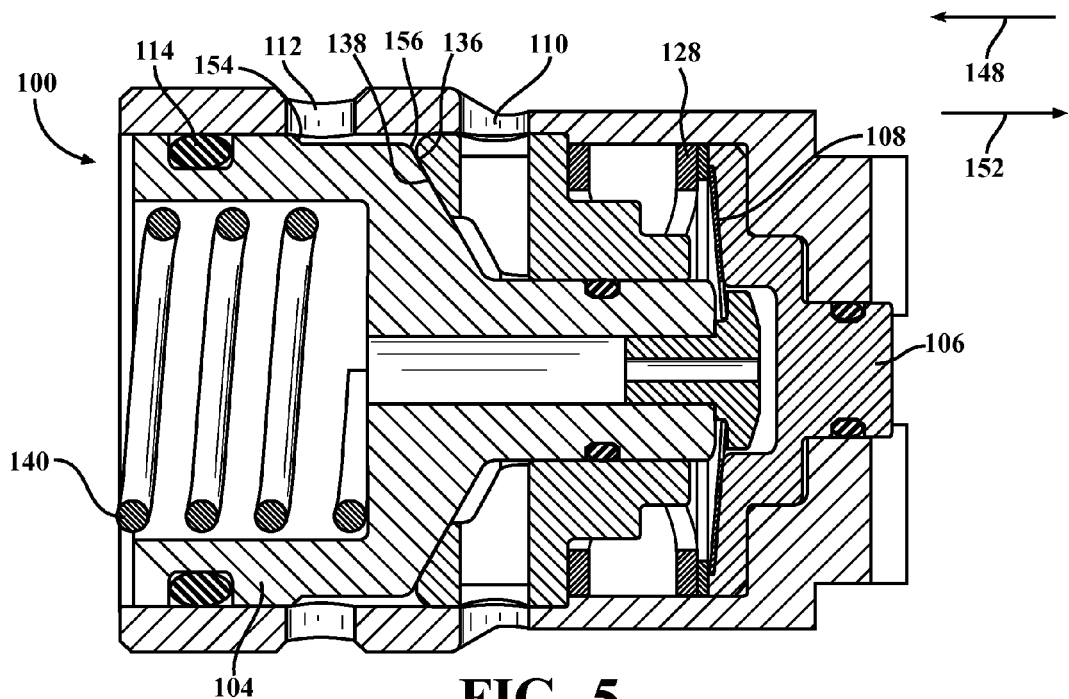
FIG. 5 is a cross-section view of the latching clutch valve of FIG. 2 shown in a flow blocking position.

The following description is made with reference to FIG. 5. FIG. 5 is a cross-section view of the latching clutch valve of FIG. 2 shown in a flow blocking position. Pressure in port 110 is lowered, or reduced, so that spring 128 displaces spring 108 and piston 106 in direction 152. Hydraulic pressure in port 112 keeps the valve open by displacing piston 104 in direction 148 until the pressure force and a spring force from holding spring 140 are in equilibrium. That is, pressure in port 112 acts on areas 154 and 156 between seal 114 and sealing surface 138 to urge piston 104 against the spring force from spring 140, keeping surfaces 136 and 138 from sealing against one another. Therefore, holding spring 140 can be selected to control a latched pressure in port 112. In an example embodiment, the latched pressure is between 0.5 and 1.5 bar, or approximately 1 bar. Since spring 108 is in the latched position, once equilibrium is reached, piston 104 is displaced farther in direction 152 by spring 140 until surfaces 136 and 138 engage on another to seal the valve so that valve 100 blocks flow between ports 110 and 112 to maintain equilibrium pressure in port 112.

Figure 6:
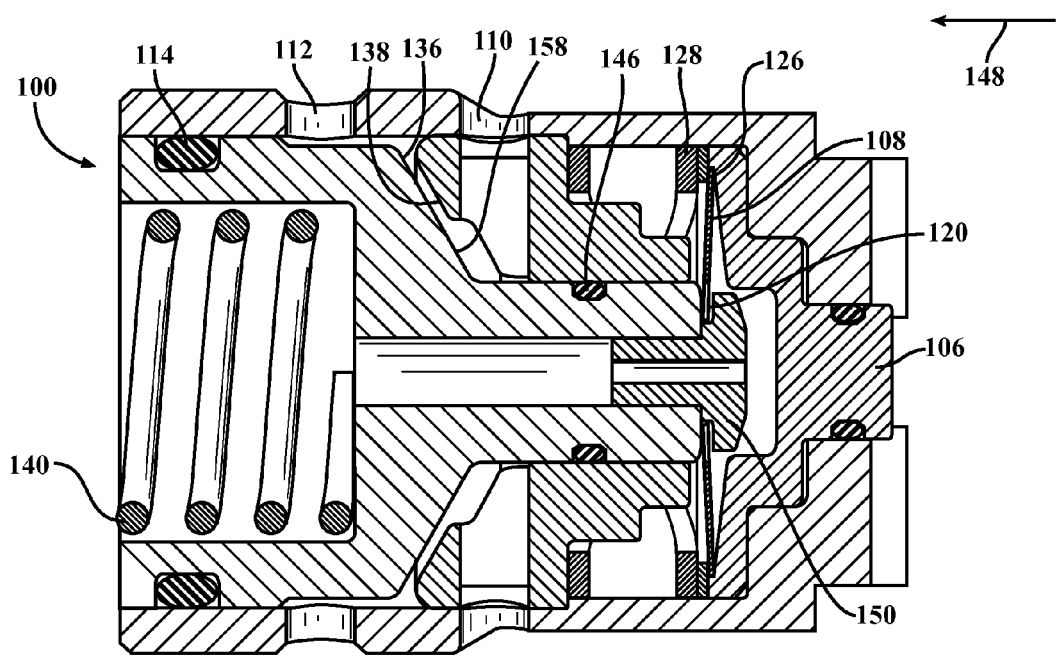
FIG. 6 is a cross-section view of the latching clutch valve of FIG. 2 shown in a snap-back position; and, FIG. 7 is a cross-section view of the latching clutch valve of FIG. 2 shown in a transmission housing

The following description is made with reference to FIG. 6. FIG. 6 is a cross-section view of the latching clutch valve of FIG. 2 shown in a snap-back position. Once the latching event has ended, valve 100 may be reset to the open, or flow through, position by application of operating pressure at port 110. Pressure in port 110 initially acts on surface 158 of valve piston 104 until the interface between surfaces 136 and 138 opens so that the pressure force acts on the entire pressure surface of piston 104 between seals 114 and 146. The pressure force acting on piston 104 is sufficient to displace spring 140 and pull retainer 150 and inner diameter 120 of spring 108 in direction 148. Outer diameter 126 of spring 108 is axially fixed between spring 128 and piston 106 because the operating pressure is below the threshold required to displace piston 106. The displacement of the inner diameter of spring 108 snaps the spring to the normal operating, or flow through, position, re-opening the valve so that ports 110 and 112 are hydraulically connected until the next latching event.

Figure 7:
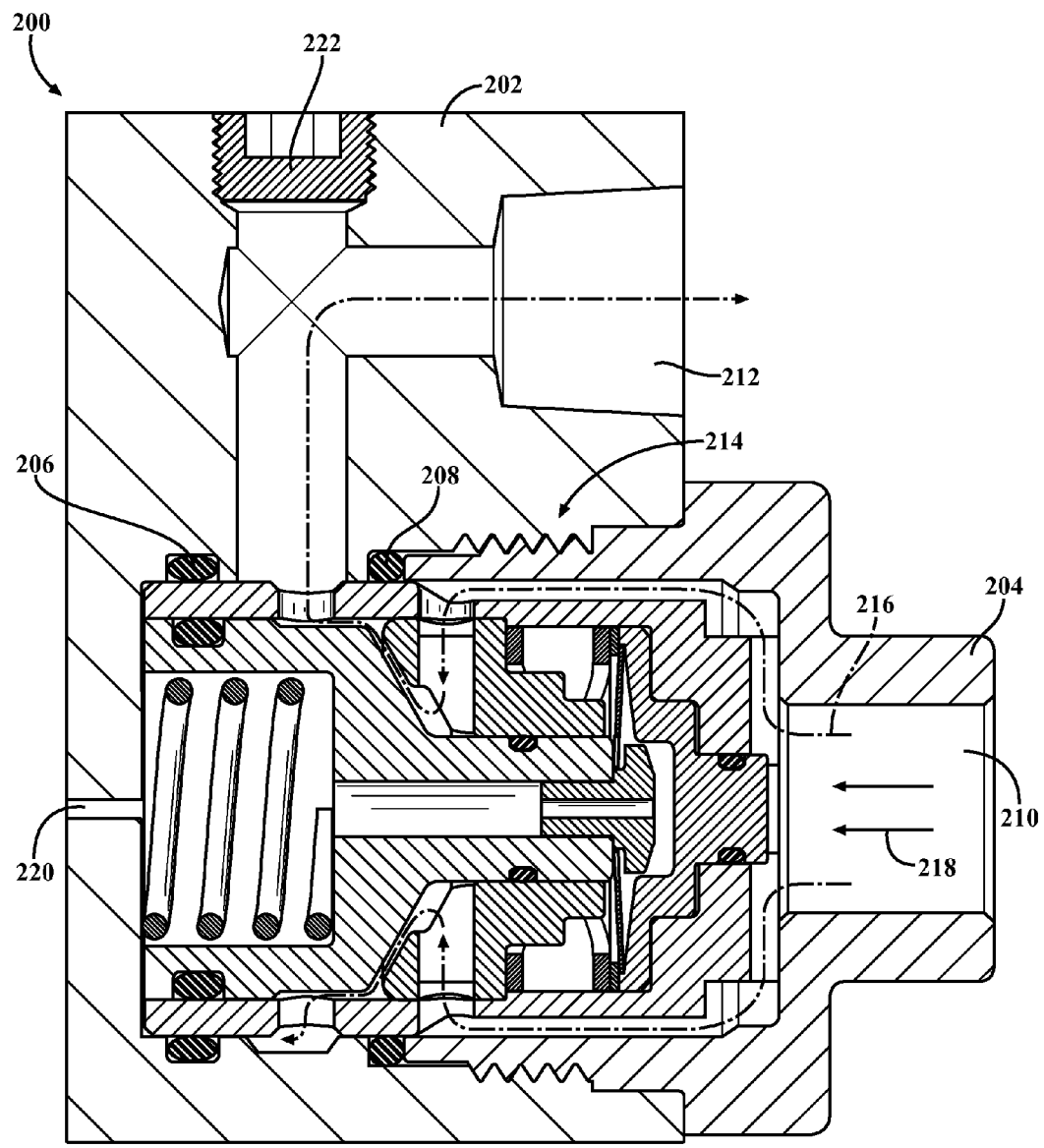

The following description is made with reference to FIG. 7. FIG. 7 is a cross-section view of the latching clutch valve of FIG. 2 shown in a vehicle transmission. Transmission 200 includes housing 202, with bore 203, and cap 204. Housing 102 is installed in bore 203. Housing 102 is sealed to the bore by o-ring seals 206 and 208. Cap 204 includes inlet port, or passage, 210 and housing 202 includes exit port, or passage, 212 hydraulically connected with a clutch pack (not shown) for the transmission. Cap 204 is threadingly engaged with bore 203 at threaded connection 214 to retain the valve in the bore. As indicated by arrows 216 and 218, flow entering cap 204 through port 210 acts on piston 106 and inlet port 110 through clearance between housing 102 and cap 204. Spring 140 is compressed between housing 102 and portion 202. Portion 202 includes orifice 220 for draining oil received from channel 150 in retainer 118. Portion 202 includes plug 222 to facilitate manufacture of an angled section of port 212.

Figure 8:
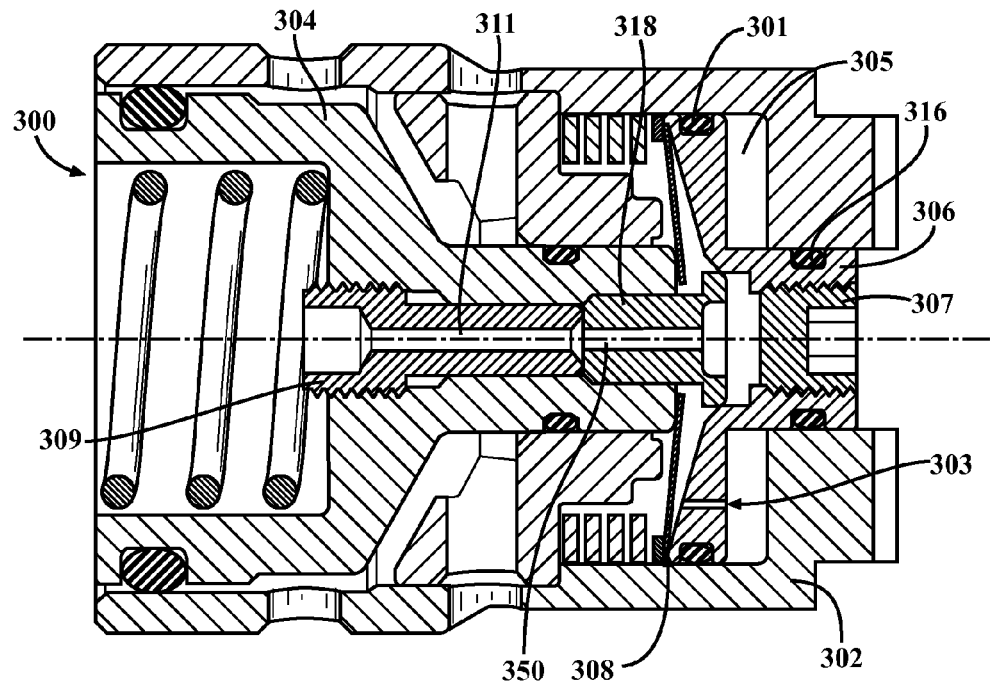
FIG. 8 is a cross-section view of a second embodiment of a latching clutch valve shown in a snap-over position.
Figure 9:
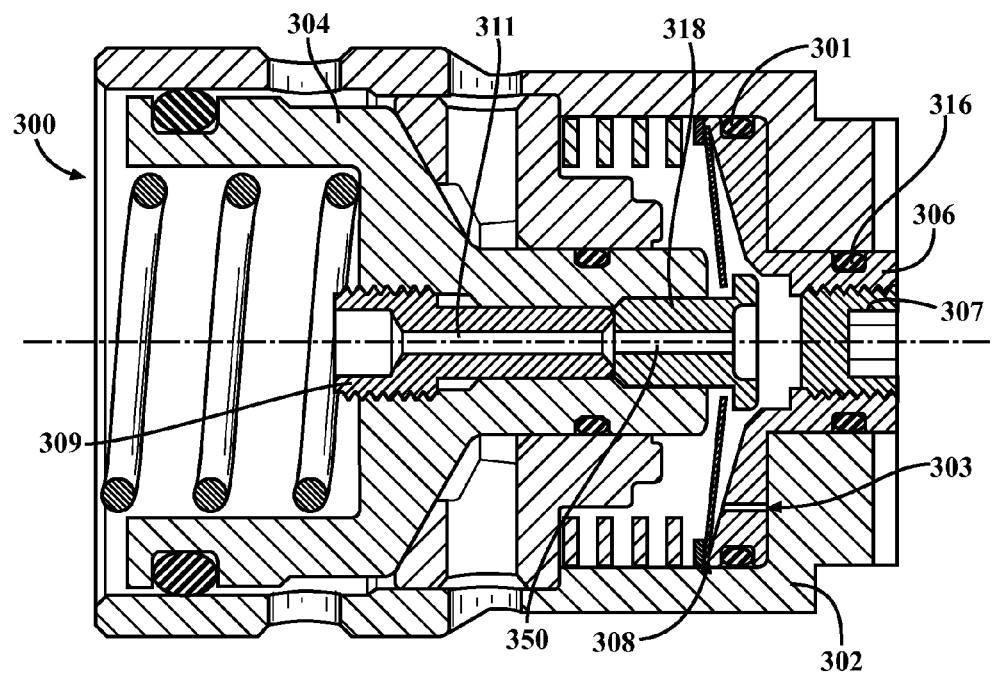
FIG. 9 is a cross-section view of the latching clutch valve of FIG. 8 shown in a flow blocking position.

The following description is made with reference to FIGS. 8-9. FIG. 8 is a cross-section view of latching clutch valve 300 shown in a snap-over position. FIG. 9 is a cross-section view of the latching clutch valve of FIG. 8 shown in a flow blocking position. The above description of latching clutch valve 100 generally applies to latching clutch valve 300 except as described below.

Valve 300 includes additional seal 301 between housing 302 and actuating piston 306. Piston 306 includes flow orifice 303. Seal 301 and orifice 303 limit an axial travel rate of piston 306. Because bi-stable spring 308 is held tight against piston 306, spring 308 may be deflected into an unblocking condition if piston 306 displaces faster than retainer 318. In other words, after an overpressure event that places the spring in a blocking position, the spring may be deflected into an unblocked position by the piston.

Seal 301 adds additional friction to slow displacement of piston 306, and, together with seal 316, creates chamber 305 (FIG. 9). As piston 306 displaces towards the housing in direction 152, air (or hydraulic fluid if there is slight leakage through any of the seals) in chamber 305 is forced through the orifice, slowing the rate of displacement of the piston. This ensures that spring 308 is deflected by valve piston 304 faster than actuating piston 306 as the operating pressure is reduced, ensuring that the spring stays in the blocking position so that flow through valve 300 is blocked.

Displacement of piston 306 lags displacement of piston 304 during the setting event as well, but the setting pressure can be maintained for a sufficient length of time so that piston 306 is fully displaced and the spring is deflected into the blocking position. When the pressure is reduced, however, the rate of pressure reduction is unimportant because the orifice compensates for a rapid pressure drop.

Piston 306 includes optional removable plug 307 threaded into piston 306. Plug 307 may be removed to adjust an axial position of retainer 318, for example. Since the retainer is threaded into the piston, a tool may be inserted through the hole in piston 306 when plug 307 is removed. This tool may be used to adjust the retainer to maintain sufficient clearance for the bi-stable spring between the piston and the retainer, preventing accidental deflection of the spring. Screw 309, threaded into a bore of piston 304, may be used to prevent unscrewing of retainer 318. In other words, once the retainer is set in a proper position, the screw is tightened against the retainer to create a bound condition. Screw 309 includes channel 311 aligned with channel 350 of retainer 318. The channels are for draining leaked fluid in a manner similar to channel 150 described above.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A hydraulic valve for a vehicle transmission comprising:
   a housing connectable with an inlet passage and an outlet passage for the transmission;
   a valve piston, sealed to the housing, for selectively blocking a fluid flow between the inlet passage and the outlet passage;
   an actuating piston sealed to the housing, displaceable relative to the valve piston, and arranged to be displaceable by a hydraulic pressure in the inlet passage; and,
   a bi-stable spring including a first portion contacting the valve piston and a second portion contacting the actuating piston.

2. The hydraulic valve of claim 1 wherein the bi-stable spring is axially fixed with regards to the valve piston and is displaceable by the actuating piston.

3. The hydraulic valve of claim 2 wherein an inner diameter of the bi-stable spring is fixed to the valve piston and displaceable in a first direction by the valve piston, and an outer diameter of the bi-stable spring is displaceable in the first direction by the actuating piston.

4. The hydraulic valve of claim 2 wherein the bi-stable spring is fixed to the valve piston by a retainer installed in a central bore of the valve piston.

5. The hydraulic valve of claim 1, wherein the housing comprises a valve seat and the valve comprises a return spring operating between the valve seat and the actuating piston.

6. The hydraulic valve of claim 1 wherein the housing comprises a valve seat with a conical surface, the valve piston comprises a conical surface, and the valve is configured to block the flow between the inlet passage and the outlet passage when the valve seat conical surface and the valve piston conical surface are in contact.

7. The hydraulic valve of claim 6 further comprising a holding spring urging the valve piston into contact with the valve seat.

8. The hydraulic valve of claim 6 wherein the valve seat comprises an inwardly-facing circumferential surface and the valve piston comprises an outwardly-facing circumferential surface sealed to the valve seat circumferential surface.

9. The hydraulic valve of claim 1 wherein:
the valve comprises a chamber partly formed by the housing and the actuating piston; and,
the actuating piston includes an orifice extending through the actuating piston to the chamber.

10. The hydraulic valve of claim 9 wherein the valve comprises first and second seals for sealing the actuating piston to the housing.

11. A vehicle transmission comprising:
the hydraulic valve of claim 1
a transmission housing including a bore; and,
a cap threadingly engaged with the bore, wherein the hydraulic valve is installed in the bore, the valve housing is sealed to the bore, and the cap retains the valve in the bore.

12. The vehicle transmission of claim 11 wherein the inlet passage extends through the cap into the bore.

13. The vehicle transmission of claim 11 wherein the outlet passage extends from the bore through the housing.

14. A method of operating a hydraulic valve for a transmission comprising the steps of:
applying an operating pressure to an actuating piston, allowing flow through the valve;
applying an actuating pressure that is higher than the operating pressure to the actuating piston to snap a bi-stable spring to a flow blocking position;
reducing the pressure to block flow between an inlet and outlet of the valve; and, applying the operating pressure to a valve piston to snap the bi-stable spring to a flow through position; wherein:
an axial displacement of the actuating piston is resisted by a return spring and a force of the actuating pressure acting on the actuating piston is greater than a force of the return spring acting on the actuating piston; or,
an axial displacement of the valve piston is resisted by a holding spring and, in a flow through position, a force of the holding spring acting on the valve piston is less than a force of the bi-stable spring acting on the valve piston.

15. The method of claim 14 wherein the operating pressure is less than 19 bar and the actuating pressure is greater than 21 bar.

16. The method of claim 14 wherein the hydraulic valve is installed in a transmission housing with an inlet and outlet passage and the force of the holding spring controls a pressure in the outlet passage when the valve is in the flow blocking position.

17. The method of claim 16 wherein the outlet passage pressure is 0.5 to 1.5 bar.

\* \* \* \* \*